June 24, 1941.  B. H. BROWALL  2,246,873
DOUBLE-ACTING SLACK ADJUSTER FOR BRAKES
Filed Oct. 3, 1940  2 Sheets-Sheet 2
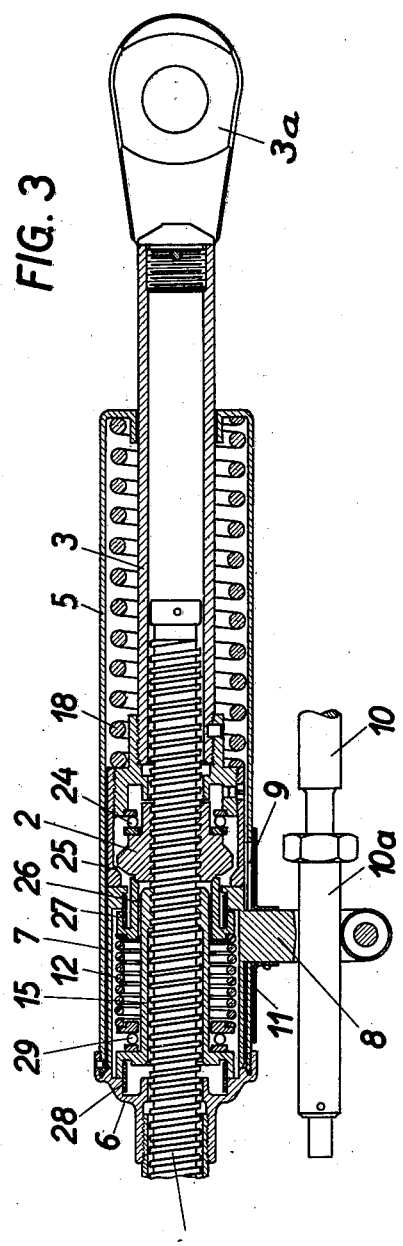
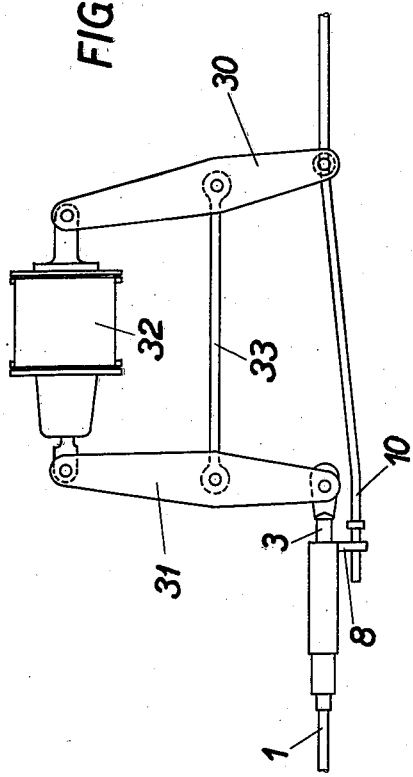
Inventor:
B. H. Browall
By E. F. Wendroth
Atty Patented June 24, 1941

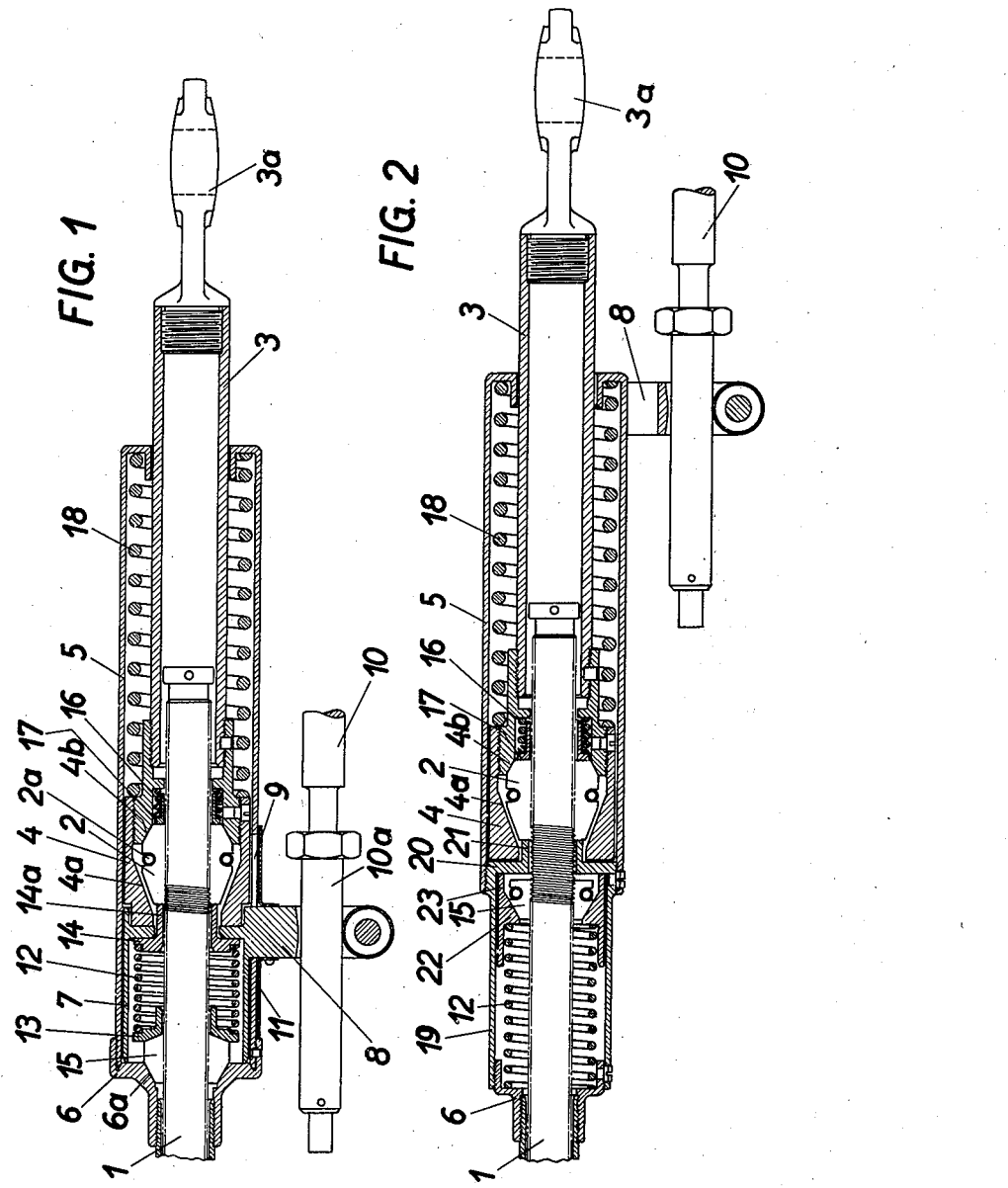

2,246,873

UNITED STATES PATENT OFFICE 2,246,873

DOUBLE-ACTING SLACK ADJUSTER FOR BRAKES

Bert Henry Browall, Malmo, Sweden, assignor to Svenska Aktiebolaget Bromsregulator, Malmo, Sweden, a corporation of Sweden Application October 3, 1940, Serial No. 359,623
In Germany August 8, 1939

3 Claims. (Cl. 188—202)

This invention relates to double-acting slack adjusters for brakes, especially for railway vehicle brakes, of the kind comprising a brake rod divided into two relatively movable parts one of which is in the form of a spindle carrying a coupling member and an adjusting member, the coupling member being movable axially in both directions on the spindle and adapted to be locked thereon for coupling the spindle to the other rod part in the slack increasing direction when the brake during application thereof reaches a position corresponding to the desired value of the slack. Several constructions of slack adjusters of this kind have already been proposed. In most of them the spindle is screw-threaded, while the coupling and adjusting members are in the form of nuts. Either the screw-threaded spindle acts as a rack, in which case the nuts are split into resiliently interconnected sectors which at axial movement of the spindle through the nuts move radially out of their engagement with the threads of the spindle, or the threads of the spindle and the nuts are given such a pitch as to be nonself-locking, so that axial movement of the spindle through the nuts takes place under rotation of the latter.

For rendering the slack adjuster double-acting usually not only the coupling member but also the adjusting member is so arranged that the spindle is movable axially in both directions therethrough. In this case the adjusting member, however, must encounter a certain resistance against axial movement on the spindle in the slack reducing direction at least, since the adjusting nut sometimes has to take the spindle along in movement in this direction and sometimes has to move axially on the spindle without taking the spindle along in the movement. To this end the adjusting member had to be provided with a friction clutch, strong springs for holding the nut sectors together, or the like. For avoiding this it has also been proposed to make the adjusting member axially movable in one direction only on the spindle and to support the same by a spring which, should the slack be too small, yields during a braking operation until the coupling member, in the desired position of the brake application stroke, is again set into action. In this case there is the drawback that the said spring at the release of the brake again expands so that no real increase of the slack or clearance between the brake shoes and the wheels at released brake is obtained, resulting in a tendency of the brake shoes to slide on the wheels.

The object of this invention is to provide such a construction of a slack adjuster of the kind hereinbefore referred to, that use can be made therein of a single adjusting member movable in one direction only of the spindle and supported by a spring, without providing for such an expansion again of the spring at release of the brake, which would result in the slack becoming too small. According to the invention this is obtained principally by making the coupling member lockable on the spindle also in the slack reducing direction and so controlling the same that it is locked in this direction when the brake during release thereof passes the position corresponding to the desired value of the slack.

The invention is illustrated by way of examples on the accompanying drawings in which—

Fig. 1 is a longitudinal section of a slack adjuster according to one form of the invention, in which the threaded spindle acts as a rack and in which the coupling and adjusting members are in the form of expandable nuts.

Fig. 2 is a longitudinal section of a slack adjuster according to a second form of the invention, in which likewise the threaded spindle acts as a rack and the coupling and adjusting members are in the form of expandable nuts.

Fig. 3 is a longitudinal section of a slack adjuster according to a third form of the invention, in which the coupling and adjusting members are in the form of nuts screwed on the threaded spindle, and in which the threads of the spindle and the nuts are of such a pitch as to be non-self-locking.

Fig. 4 is a diagrammatic view illustrating one way of mounting the slack adjuster in a brake rigging.

Referring first to Fig. 1, the slack adjuster comprises a screw-threaded spindle 1 which acts as a rack and carries a coupling nut 2 which is expandable by being split into a number of sectors resiliently held together preferably by means of a surrounding coiled spring 2a. The threads of the spindle act as rack teeth having both sides bevelled in opposite directions for making possible axial movement of the spindle in both directions through the coupling nut. The spindle 1 forms one part of a two-part brake rod the other part 3 of which is tubular and provided with an attaching eye 3a. The coupling nut 2 is housed in a housing 4 secured on the rod part 3 and provided on its inside with two opposing conical seats 4a, 4b conforming to corresponding conical outer surfaces on the coupling nut 2 but arranged at a distance from each other for permitting a certain axial movement of the coupling nut 2 between the two seats 4a and 4b. Around the housing 4 and rod part 3 there is a sleeve-shaped casing 5, called the mantle, closed by a lid 6 at the end facing the spindle 1. In the mantle 5 between said lid 6 and the housing 4 there is a movable sleeve 7 provided with a stud 8 projecting laterally through a slot 9 in the side of the mantle 5. The outer end of the stud 8 is bifurcated and straddles the end portion of an operating rod 10 (compare Fig. 4) provided with an adjustable abutment preferably formed on a sleeve 10a screwed on the end of the said rod 10. On the stud 8 there is secured a cover plate 11 for preventing dirt from finding its way into the apparatus through the slot 9.

Inside of the sleeve 7 there is a spring 12 confined between two disks 13 and 14 which are movable on the spindle 1. The disk 13 holds an adjusting nut 15, which is split into sectors in the same manner as the coupling nut 2, pressed against a conical seat 6a on the lid 6. The coacting thrust surfaces on the disk 13 and the nut 15 are slightly conical for holding the sectors of the adjusting nut together without the use of a surrounding spring. The disk 14 is provided with a cylindrical extension 14a, which in the position shown in Fig. 1 abuts the coupling nut 2 and holds the latter out of engagement with the conical seat 4a but in engagement with the opposing conical seat 4b. On the same side of the nut 2 as the seat 4b there is a small spring 16 acting upon a sleeve 17 and tending to move the nut 2 away from the seat 4b. However, since the spring 12 is stronger than the spring 16, the nut 2 is held by the action of the spring 12 in engagement with the seat 4b.

Finally a relatively strong spring 18 is confined between the housing 4 and the end of the mantle 5 opposite to the lid 6.

The operation of the device is as follows. As soon as an application of the brake begins, the rod part 3 is pulled to the right, as viewed on the drawings. The rod part of spindle 1 is taken along in this movement by the spring 18, the mantle 5, the lid 6 and the nut 15. When the application stroke of the brake reaches the value corresponding to the original distance between the stud 8 and the abutment therefor on the operating rod 10, the operating rod 10 stops the stud 8 and thus moves the sleeve 7 to the left in relation to the other parts of the apparatus. This results in the disk 14 being moved with its cylindrical extension 14a out of the housing 4, so that the nut 2 is permitted to engage the seat 4a and thus couple the spindle 1 to the rod part 3 in the slack increasing direction. At the continued application movement of the brake the sleeve 7 and the disk 14 are moved still further to the left away from the housing 4, and since the sleeve 7 abuts the lid 6 also the mantle 5 is moved to the left in relation to the housing 4 under compression of the spring 18. During this movement the adjusting nut 15 is pressed by the spring 12 against the seat 6a so that the adjusting nut 15 is moved to the left on the spindle 1 to the same degree as the lid 6.

When release of the brake begins, the rod parts 1 and 3 are under the braking stress, and by this stress the coupling nut 2 is held in abutting contact with the seat 4a. Thus, during the first part of the brake release movement it is impossible for the spindle 1 to move through the nut 2 and, therefore, notwithstanding that the rod 10 and the sleeve 7 begin to move to the right, as viewed on the drawings, in relation to the other parts, the mantle 5 and the lid 6 are prevented by the adjusting nut 15 from partaking in this movement. Consequently, the spring 18 temporarily remains in the state of compression obtained during the braking operation. The spring 12, on the contrary, expands again during this part of the release movement and holds the disk 14 pressed against the right end of the sleeve 7 all the time.

If the brake slack has the correct value, the sleeve 7 reaches its normal position, in which the disk 14 with its cylindrical portion 14a abuts the coupling nut 2, in the moment of the brake release movement in which the braking stress ceases. When this occurs the disk 14 moves the coupling nut 2 in abutting contact with the seat 4b, and notwithstanding that the spring 18 by means of the mantle 5, the lid 6, the seat 6a and the adjusting nut 15 tends to move the spindle 1 to the left through the nut 2, such movement of the spindle 1 is prevented by the nut 2 engaging the seat 4b. Consequently no slack adjustment takes place, the slack being maintained at its correct value.

If the slack is too large, the braking stress ceases during the release of the brake before the disk 14 has reached in contact with the nut 2, and so the spring 18 can move the spindle 1 to the right through the nut 2 which is now supported by the sleeve 17 and the spring 16 in such a manner as to permit expansion of the nut 2, that is movement of its sectors radially out of their engagement with the threads of the spindle 1. This slack adjusting movement continues during the brake release movement until the extension 14a of the disk 14 again abuts the nut 2. Thereupon further slack adjusting movement is prevented in the same manner as hereinbefore described, namely by the nut 2 being engaged with the seat 4b against the action of the spring 16. The further brake release movement after the nut 2 having thus been engaged with the seat 4b corresponds to the correct value of the slack and, consequently, the slack has been adjusted just as much as to bring it to its correct value again.

On the other hand, if the slack is too small, the following occurs at application of the brake. Until the braking stress sets in, that is until the slack has been consumed, the rod 1 is taken along in the movement of the rod 3 to the right by the spring 18, the mantle 5, the lid 6 and the nut 15. When the braking stress sets in the sleeve 7 has not yet been moved by the operating rod 10 and still takes the position shown on the drawings in relation to the other parts. Due to the arising braking stress being transmitted from the rod 3 to the rod 1 by the spring 18, the mantle 5, the lid 6 and the nut 15, the spring 18 is acted upon by the said stress and yields thereto as the brake application movement continues. Due to the relative movement between the rods 1 and 3 resulting from the yielding of the spring 18, the nut 2 is moved out of engagement with the seat 4b against the action of the spring 12, so that the sectors of the nut 2 are allowed to move out of engagement with the threads of the spindle 1 for permitting movement of the latter through the nut 2. In this manner the brake rod parts 1 and 3 are moved in relation to each other in the slack increasing direction by the beginning braking stress under compression of the spring 18, and this slack increasing movement of the slack adjuster continues until, at the reach of the position of the braking movement corresponding to the correct value of the slack, the sleeve 7 and the disk 14 are moved by the operating rod 10 away from the housing 4 and the coupling nut 2 which is thereby allowed to engage the seat 4a for firmly coupling the two brake rod parts 1 and 3 to each other in the slack increasing direction. During the continued movement of the brake the operating rod 10 only moves the sleeve 7 a little longer away from the housing 4 under compression of the spring 12. At the release of the brake the disk 14, as already described, acts upon the nut 2 and presses it against the seat 4b so that, notwithstanding the compressed state of the spring 18, a slack reducing movement cannot take place.

Obviously the slack increasing capacity of the above described slack adjuster is dependent on the length of the slot 9 which in Fig. 1 extends to the right from the stud 8. Thus, should the operating rod 10 fail to operate for some reason or the other at a braking operation, the rod parts 1 and 3 of the slack adjuster will be moved in the slack increasing direction until the freedom of movement of the mantle 5 in relation to the stud 8 is consumed, that is until the stud 8 reaches the right end of the slot 9. By a further slack increasing movement the stud 8 and the sleeve 7 are moved away from the housing 4 so that the nut 2 couples the spindle 1 to the rod part 3 in the slack increasing direction. Braking is thus still possible, although with the slack more or less increased, depending upon the length given to the slot 9. Obviously this length can be chosen so according to circumstances that the brake still can be used, barely enough at least until it can be repaired.

In the form of the invention shown in Fig. 2 the stud 8 is arranged on the mantle 5 with which is rigidly connected a sleeve-shaped part 19 corresponding to the sleeve 7 in the form of Fig. 1. An abutment flange 20 on the sleeve 19 corresponds to the disk 14 in the form of Fig. 1 and is provided with a cylindrical extension 21 corresponding to the extension 14a of the said disk 14. The conical seat 22 for the adjusting nut 15 is axially movable in the sleeve 19 and is biased against the adjusting nut 15 by the spring 12. The movement of the seat 22 to the right is limited at a sufficient distance from the abutment 20 for permitting the nut 15, at movement of the mantle 5 and the sleeve 19 to the left in relation to the spindle 1, to disengage itself from the seat 22 and abut the abutment 20 which effects the movement of the nut 15 on the spindle 1. In this form of the invention it is the spring 18 that at release of the brake moves the coupling nut 2 into engagement with the seat 4b, namely by the intermediary of the mantle 5, the flange 20 and the cylindrical extension 21, whereas it is the spring 12 that by means of the adjusting nut 15 effects the movement of the spindle 1 in relation to the rod part 3 in the slack reducing direction. In all other respects the parts are arranged and operate in the same manner as in the form of Fig. 1.

Fig. 3 illustrates a form of the invention for applying principally the same construction as that shown in Fig. 1 to a slack adjuster of the type in which the threads of the spindle and the coupling and adjusting nuts 2 and 15 screwed thereon are of such a pitch as to make them non-self-locking so that the nuts are rotatable and thus axially movable on the spindle by thrust forces therebetween. The coupling nut 2 supports itself to the right against the brake rod parts 3 by means of an antifriction thrust bearing 24. Locking of the coupling nut 2 in the slack increasing direction takes place in a known manner by the said nut, at movement of the brake rod parts 1 and 3 in the slack increasing direction in relation to each other, coming in frictional engagement with a part 25 on the rod part 3. Said part 25 may be said to correspond to the seat 4a in the form of Fig. 1. A sleeve 26 corresponding to the cylindrical extension 14a in Fig. 1 is constructed as one member of a clutch the other member of which consists of a correspondingly shaped part of the nut 2. This clutch may be constructed either as a friction clutch or with teeth on the clutch members. A so-called one-way clutch spring 27 is arranged between the non-rotatable sleeve 7 and the sleeve 26 for preventing rotation of the latter in the slack increasing direction so that also the nut 2 through its engagement with the sleeve 26 is locked against rotation in this direction in the position shown in Fig. 3. A one-way clutch spring 28 for preventing rotation of the adjusting nut 15 in the slack increasing direction is arranged between the nut 15 and the lid 6. For easy rotation of the nut 15 in the slack reducing direction an antifriction thrust bearing 29 is inserted between the spring 12 and the nut 15. The other parts of the apparatus are arranged in the same manner as those of the form of Fig. 1, and the operation is the same as that of the form of Fig. 1, only that the nuts 2 and 15 rotate at their axial movements on the spindle 1 instead of being radially expanded. The use of rotatable instead of expandable nuts has certain advantages which are known per se to those skilled in the art.

Fig. 4 diagrammatically illustrates one way of mounting a slack adjuster of the kind herein referred to in a brake rigging. The operating rod 10 is connected to the free end of the dead brake lever 30 and the two-part brake rod 1, 3 of the slack adjuster is connected to the free end of the live brake lever 31 of a brake rigging of a conventional type including a brake cylinder 32 and a tie rod 33 between the two brake levers.

What I claim and desire to secure by Letters Patent is:

1. A double-acting slack adjuster for brakes of the character described, comprising a brake rod divided into two parts movable axially in relation to each other in one direction for increasing and in the other direction for reducing the slack, one of said brake rod parts being in the form of a spindle, a coupling member and an adjusting member carried on said spindle, said coupling member being movable axially in both directions and said adjusting member in the slack reducing direction only on said spindle, means for yieldingly supporting said adjusting member in the slack increasing direction against the other brake rod part, means capable of coaction with said coupling member for locking it on said spindle in the slack increasing direction, means capable of coaction with said coupling member for locking it on said spindle in the slack reducing direction, and means operable in dependence on the movement of the brake at application and release thereof for so controlling the coaction of both said locking means with said coupling member that locking of said coupling member on said spindle in the slack increasing direction takes place during application of the brake in a position thereof corresponding to the desired value of the slack and locking of said coupling member on said spindle in the slack reducing direction takes place when the brake during release of the same passes said position.

2. A double-acting slack adjuster as claimed in claim 1, in which said two means for locking said coupling member on said spindle in the slack increasing and reducing directions, respectively, comprise two opposing seats carried on said other rod part, said coupling member being movable between said seats into engagement with one of them for locking itself on said spindle in the slack increasing direction and into engagement with the other of them for locking itself on said spindle in the slack reducing direction, and a spring being provided which tends to move and hold said coupling member out of engagement with said last mentioned seat.

3. A double-acting slack adjuster as claimed in claim 1, in which said spindle is screw-threaded and said coupling and adjusting members are in the form of nuts screwed on said spindle, the threads of said spindle and said nuts being of such a pitch as to be non-self-locking, and in which said controlling means includes a non-rotatable sleeve movable axially in relation to said other rod part, while said means capable of coaction with said coupling member for locking it on said spindle in the slack reducing direction comprises a clutch one half of which is formed on said coupling member and the other half of which is formed on an abutment member for coaction with said coupling member, said abutment member being connected rotatably in the slack increasing direction only to said non-rotatable sleeve of said controlling means and forming a part thereof.

BERT HENRY BROWALL.